United States Patent [19]

Segawa et al.

[11] 4,293,523

[45] Oct. 6, 1981

[54] APPARATUS FOR PRODUCING POTASSIUM SILICATE FERTILIZER

[75] Inventors: Hiroshi Segawa, Tokyo; Katsufumi Akizuki, Yokohama, both of Japan

[73] Assignee: Denpatsu Fly Ash, Tokyo, Japan

[21] Appl. No.: 177,698

[22] Filed: Aug. 12, 1980

Related U.S. Application Data

[62] Division of Ser. No. 48,121, Jun. 13, 1979.

[30] Foreign Application Priority Data

Jun. 13, 1978 [JP] Japan ................................. 53-70380

[51] Int. Cl.³ ............................ B01J 6/00; B01J 8/26; B01J 8/24; F27B 15/08
[52] U.S. Cl. ........................................ 422/139; 71/62; 422/142; 422/145
[58] Field of Search ...................... 422/139, 145, 142; 71/62; 201/6, 31

[56] References Cited

U.S. PATENT DOCUMENTS

| | | | |
|---|---|---|---|
| 1,401,648 | 12/1921 | Rossi ................................... | 71/62 X |
| 2,352,738 | 7/1944 | Ruthruff ............................. | 423/334 |
| 2,374,035 | 4/1945 | Artting ................................ | 423/334 |
| 2,773,018 | 12/1956 | Parry .................................. | 201/31 |
| 2,948,948 | 8/1960 | Duplen et al. ................. | 106/DIG. 1 |
| 3,758,305 | 9/1973 | Fisher ................................. | 201/6 |
| 3,843,559 | 10/1974 | Repik et al. ...................... | 201/31 X |
| 3,971,631 | 7/1976 | Alinagro et al. ............... | 423/334 X |
| 4,178,215 | 12/1979 | Kintani et al. .................. | 201/6 |

FOREIGN PATENT DOCUMENTS

50-119000  9/1975  Japan ................................. 423/334

Primary Examiner—Barry Richman
Attorney, Agent, or Firm—Beveridge, DeGrandi, Kline & Lunsford

[57] ABSTRACT

A process for producing a citric acid soluble potassium silicate fertilizer comprises a step for kneading a mixture consisting essentially of potassium carbonate, fly ash, pulverized coal, other necessary starting materials and a caustic potash solution as a binder and then granulating the kneaded mixture, a step for drying the granulated product to a nearly absolutely dry state, and a step for calcining the dried granular product, whereby a chemical reaction takes place between the potassium and the silicon present in fly ash to convert them into a citric acid soluble potassium silicate. A process according to a second embodiment comprises a step for kneading a mixture consisting essentially of a potassium source, such as potash and/or potassium carbonate, fly ash, other components necessary for the production of citric acid soluble potassium silicate fertilizer and a binder, such as alcoholic waste liquor or the like, and then granulating the kneaded mixture, a step for drying the kneaded mixture to a nearly absolutely dry state, and a step for calcining the dried granular product, whereby a chemical reaction takes place between the potassium and the silicic acid present in fly ash to form a citric acid soluble potassium silicate. An apparatus for practicing the processes mentioned above comprises a plurality of continuous quantitative feeders, a continuous kneader, an extruder for forming granules, a fluid dryer, a fluid calcining furnace, and a cooling device for cooling calcined product.

11 Claims, 2 Drawing Figures

APPARATUS FOR PRODUCING POTASSIUM SILICATE FERTILIZER

This is a division of application Ser. No. 048,121 filed June 13, 1979.

BACKGROUND OF THE INVENTION

The present invention relates to a process for producing citric acid soluble potassium silicate fertilizer in a high yield and with a high heat efficiency, and to an apparatus for practicing said process.

As is well known, a citric acid soluble potassium fertilizer can be solubilized by the citric acid excreted by the roots of plants, but only a certain amount of the fertilizer is solubilized and absorbed into the plant. Unlike the usual water-soluble potassium fertilizers, the citric acid soluble potassium fertilizer is resistant to rain water. Further, it neutralizes acid in soil caused by the citric acid excreted by plant roots. Although such a citric acid soluble potassium fertilizer is suitable for Japanese agriculture where the climate is relatively warm and rainy and the acidification of soil is already at an advanced stage due to the use of chemical fertilizers, such as ammonium sulfate, its practical use is only rare. This is mainly attributable to the fact that if a citric acid soluble potassium silicate fertilizer is produced by the conventional process from fly ash as a silicic acid source, a continuous operation is quite difficult to conduct because of the high temperature necessary for calcination, which inevitably results in high cost as compared with other fertilizers. In addition, such fertilizers produced using known techniques lack uniform product quality.

Earnest studies have been conducted with the aim of overcoming the above-mentioned difficulties encountered with citric acid soluble potassium fertilizers. As a result, it has been discovered that an inexpensive potassium fertilizer of high quality can be produced with a high efficienty by utilizing fly ash, such as that formed in power stations operated with coal, together with inexpensive crude caustic potash or alcoholic waste liquor.

Fly ash is contained in waste gases formed in boilers and furnaces operated with pulverized coal, such as those in thermal power stations. The fly ash contains a large quantity of silicon. If the fly ash is admixed with a potassium source, such as caustic potash (KOH) or potassium carbonate and calcined at a temperature of about 600° C. to 1,100° C., the potassium reacts with the silicon present in fly ash to form a citric acid soluble potassium silicate. The chemical reactions that occur can be expressed by the following chemical equations:

If caustic potash is used as potassium source,

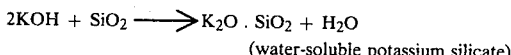
(water-soluble potassium silicate)

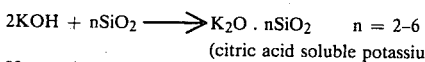
(citric acid soluble potassium silicate);

If potassium carbonate is used as potassium source,

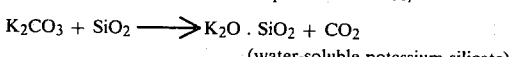
(water-soluble potassium silicate)

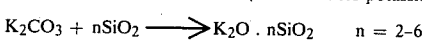
(citric acid soluble potassium silicate).

As is well known, fly ash has a size of micron order, so that if one wishes to calcine it, such as by means of a fluid calcining furnace, it scatters in the hot air used as the calcination medium, and the calcination cannot be carried out.

SUMMARY OF THE INVENTION

In view of the above, the problems have been earnestly studied, and it has been discovered that calcination can be carried out with high efficiency if the starting materials, such as fly ash, potassium source and other required materials are kneaded with a binder, such as caustic potash solution or alcoholic waste liquor, and then the kneaded mixture is formed into granules having a size of about 3 to about 5 mm. The granules can then be calcined to form a product that is usually cooled, pulverized further granulated and dried, after which it is shipped as a final product.

More particularly, a first embodiment of this invention provides a process for producing citric acid soluble potassium silicate fertilizer. The process comprises:

(a) forming a mixture comprising a solution of caustic potash as a binder, potassium carbonate, fly ash and pulverized coal;

(b) kneading the mixture by means of a continuous kneader;

(c) forming the resulting kneaded mixture into granules by means of an extruder;

(d) drying said granules to a state of substantially absolute dryness by means of a fluidized dryer; and (e) calcining the resulting dried granules by means of a fluidized calcining furnace in order to chemically react the potassium with silicon present in the fly ash and thereby form a citric acid soluble potassium silicate.

A second embodiment of this invention provides a process for producing a citric acid soluble potassium silicate fertilizer comprising:

(a) forming a mixture comprising alcoholic waste liquor as a binder, a potassium source and fly ash;

(b) kneading the mixture by means of a continuous kneader;

(c) forming the resulting kneaded mixture into granules by means of an extruder;

(d) drying the granules to a state of substantially absolute dryness by means of a fluidized dryer; and (e) calcining the resulting dried granules by means of a fluidized calcining furnace in order to chemically react the potassium with silicic acid present in the fly ash and thereby form a citric acid soluble potassium silicate.

Additionally, this invention provides an apparatus for producing a citric acid soluble potassium silicate fertilizer according to the processes of this invention, which apparatus comprises:

(a) a plurality of continuous quantitative feeders for supplying the binder, potassium source, fly ash and pulverized coal for forming the mixture;

(b) a continuous kneader for continuously kneading the mixture;

(c) an extruder for forming the resulting kneaded mixture into granules;

(d) a fluidized dryer for drying the granules to a state of substantially absolute dryness;

(e) a fluidized calcining furnace for calcining dried granules in order to chemically react potassium with silicon present in the fly ash and thereby form a citric acid soluble potassium silicate; and (f) a cooling device for cooling the resulting calcined product.

BRIEF DESCRIPTION OF THE DRAWINGS

The accompanying drawings diagrammatically illustrate two embodiments of the invention.

DETAILED DESCRIPTION

In practicing this invention, the pulverized coal generates heat throughout the period during which the kneaded and granulated product is calcined in the fluid calcining furnace, and thereby acts so as to maintain the granular product at a high temperature over a long period of time.

In another embodiment of this invention, the calcined product is cooled by means of a high speed cooling device, and then pulverized into powder by means of a pulverizer, after which it is transferred to a product storage tank.

When the calcined and pulverized product is to be shipped in the form of a powdery product, it can be taken out of the product storage tank by means of a screw feeder and transported to a package station.

When the calcined and pulverized product is to be shipped in a granular form, it can be fed by means of a screw feeder into a granulator where it can be kneaded together with an added water-soluble binder, granulated and dried, after which it can be transported to a package station.

In order to prepare a calcined product in a granular form, the apparatus of the invention can additionally be equipped with a pulverizer for pulverizing the calcined and cooled product, a storage tank for storing the pulverized product, a granulator for kneading and granulating the product carried out of the storage tank and a second fluid dryer for drying the granulated product.

Preferably, waste gas that is discharged from the first fluid dryer is introduced into a dry dust chamber to remove floating dust, and then the removed floating dust is returned to the continuous kneader.

Preferably, waste gas that is discharged from the fluid calcining furnace is introduced into a heat exchanger, and the waste heat is transmitted to low temperature air from a secondary line. The air heated thereby can then be supplied to the first fluid dryer for use as a drying medium.

Further, it is preferable to supply waste gas discharged from the cooler directly into a second fluid dryer for use as a drying medium.

It is also preferable to introduce waste gas from the second fluid dryer into a dry dust chamber where floating dust present therein is removed. The removed floating dust can then be returned to a product storage tank.

In another embodiment of this invention, there is provided a hot air generating device where natural gas or a fuel oil is burned in order to supply a calcining medium of high temperature to the fluidized calcining furnace used for the calcination of granulated product. Preferably, waste gas discharged from the fluidized calcining furnace is returned to said hot air generating device via a heat exchanger.

It is also preferable that waste heat is waste gas discharged from the fluid calcining furnace be transmitted to the low temperature air via the first and second heat exchangers, and the air heated thereby then supplied to the second dryer as a drying medium.

Figure 1:
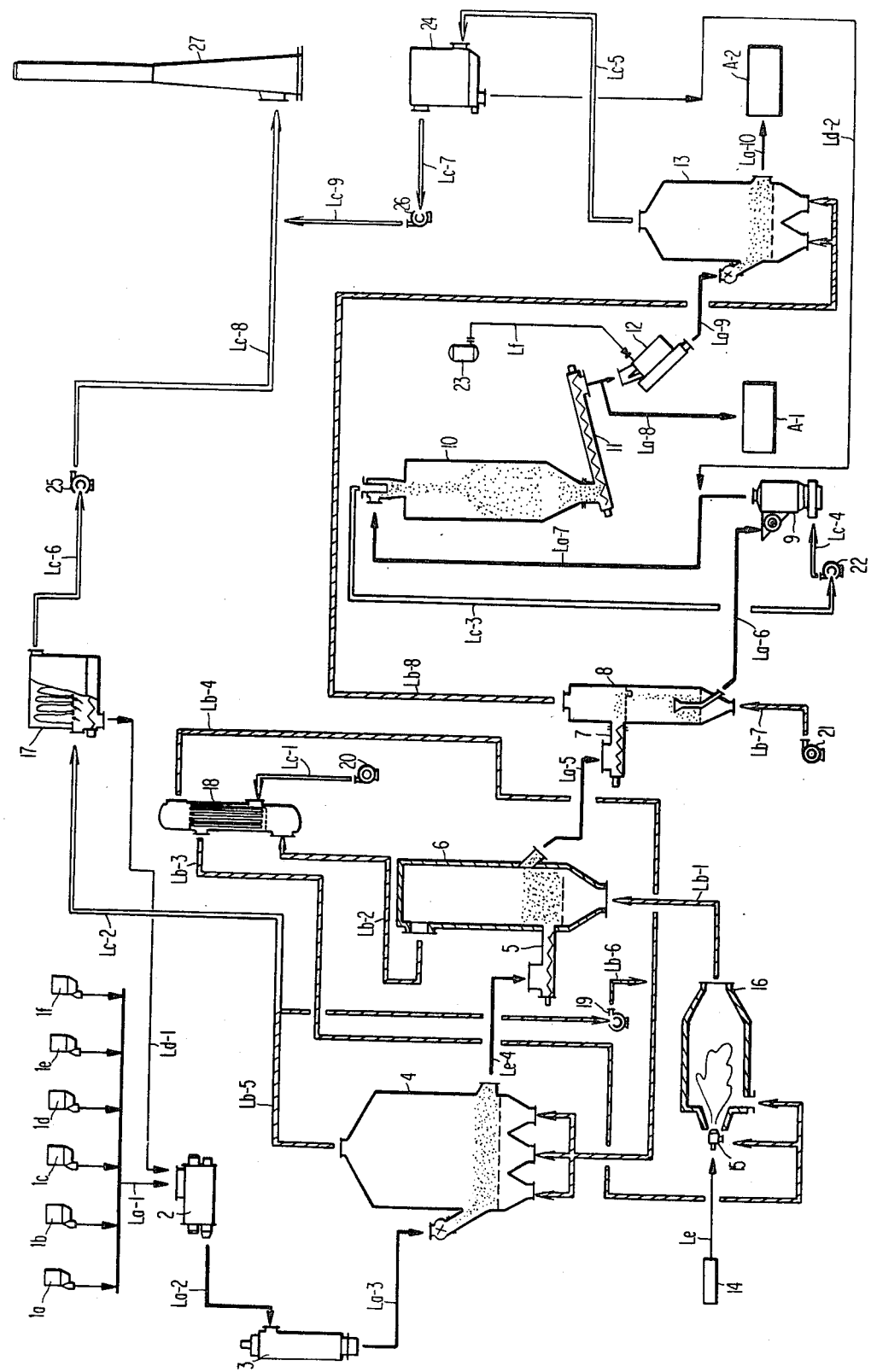
FIG. 1 is a flow sheet for the production of citric acid soluble silicate fertilizer according to the first embodiment of the invention.

Now, the invention will be described in greater detail with reference to FIG. 1. As shown in the left upper part of the Figure, there are provided quantitative feeders $1a$ to $1f$ for continuously measuring and feeding materials. The first continuous quantitative feeder $1a$ continuously measures 48% caustic potash (KOH) and feeds it into continuous kneader 2 via line La-1. Similarly, second feeder $1b$ handles potassium carbonate ($K_2CO_3$), third feeder $1c$ handles magnesium hydroxide [$Mg(OH)_2$], fourth feeder $1d$ handles pulverized coal and sixth feeder $1f$ handles fly ash. The fifth feeder $1e$ is a reserve. It should be noted that the above-mentioned magnesium hydroxide is not indispensable in the invention.

The materials supplied by the continuous quantitative feeders $1a$–$1f$ are kneaded in continuous kneader 2 to give a slime, which passes line La-2 and reaches extruder 3. The slimy material is formed by extruder 3 into granules of about 3 to about 5 mm size, and the granules are then supplied to fluid dryer 4 via line La-3.

Fluid dryer 4 is a fluidized bed type of dryer equipped with a porous plate. One blows hot air, recovered in heat exchanger 18 mentioned later, via line Lb-4, whereby granules on the porous plate are fluidized and dried to a state of absolute dryness where no water is contained at all. The drying temperature is in the range of about 200° to about 300° C., and the drying time is about 10 minutes. This is for the reason that if drying temperature is higher than about 300° C., there occur cracks in the granule, and if it is lower than about 200° C., an absolute dryness is quite difficult to reach.

Floating dust leaving fluid dryer 4 passes lines Lb-5 and Lc-2 and reaches dry dust chamber 17 where it is recovered. Recovered material is returned to continuous kneader 2 via line Ld-1. A part of the hot air leaving fluid dryer 4 is recycled to fluid dryer 4 via lines Lb-5 and Lb-6 with the aid of recycling fan 19.

The granular product, which has been dried to the state of absolute dryness in fluid dryer 4, passes line Le-4 and is supplied to fluid calcining furnace 6 by screw feeder 5. Fluid calcining furnace 6 is a fluidized bed type equipped with a porous plate. The granular product on the porous plate is calcined and brought into a fluidized state by the action of hot air, which has been introduced from hot air generator 16 via line Lb-1. Silicon present in fly ash reacts with potassium to form a citric acid soluble potassium silicate. The calcining temperature in fluid calcining furnace 6 is in the range of about 900° to about 1,100° C. and the time period of calcination is about 15 minutes. This is for the reason that if calcining temperature is lower than about 900° C., no reaction takes place. If it is higher than about 1,100° C., the granules soften to form plate-like matter.

Hot air generator 16 has an adjacent liquefied gas tank 14 from which liquefied gas is fed into hot air generator 16 via line Le by pump 15. The higher temperature waste gas leaving fluid calcining furnace 6 passes line Lb-2 and reaches heat exchanger 18 where it releases its heat by means of heat exchange, after which it passes line Lb-3 and reaches hot air generator 16 again. On the other hand, air supplied from blower 20 into heat exchanger 18 via line Lc-1 and heated there passes line Lb-4 and reaches fluid dryer 4.

The product, which has completely been calcined in fluid calcining furnace 6, passes line La-5 and is sent to high speed cooling device 8 by screw feeder 7. High speed cooling device 8 is a fluidized bed type of cooler equipped with a porous plate. Cold air supplied by cooling fan 21 via line Lb-7 fluidizes the calcined product and rapidly cools it. Hot air leaving the high speed cooling device 8 passes line Lb-8 and reaches second fluid dryer 13 mentioned later where it is used as a drying medium for fluid dryer 13. The residence time of calcined product in the high speed cooling device 8 is about 10 minutes.

Product cooled in high speed cooling device 8 passes line La-6 and reaches pulverizer 9 where it is pulverized into powder, after which it is transported to product storage tank 10 via line La-7. Floating dust leaving product storage tank 10 passes line Lc-3 and is recovered, after which it is returned to pulverizer 9 via Lc-4 by transporting fan 22. The product in storage tank 10 is shipped as a powdery product A-1 via screw feeder 11 and line La-8. Otherwise, the product is sent to granulator 12 where it is kneaded together with a binder, i.e., water or other water-soluble binder fed from binder tank 23 via line Lf, and granulated, after which it passes line La-9, is dried in second fluid dryer 13, passes line La-10 and is then shipped as a granular product A-2. Floating dust leaving second fluid dryer 13 passes line Lc-5, is recovered in dry dust chamber 24, then passes line Ld-2 and is finally recovered in line La-7.

Waste gas leaving dry dust chamber 17 is driven by waste gas fan 25 and passes lines Lc-6 and Lc-8 to be released into the atmosphere from chimney 27, while waste gas leaving dry dust chamber 24 is driven by waste gas fan 26 and passes lines Lc-7 and Lc-9 to be released into the atmosphere via chimney 27.

A concrete example of the above-mentioned process is described below.

Starting materials were measured in continuous quantitative feeders 1a–1f in the following proportions:
0.88 T/H of 45% caustic potash solution as a binder,
0.436 T/H of potassium carbonate,
0.136 T/H of magnesium hydroxide,
0.4 T/H of pulverized coal, and
2.148 T/H of fly ash.
The materials were sent to continuous kneader 2 and kneaded therein. After kneading, the slimy starting mixture was supplied to extruder 3 where it was granulated into cylindrical granules having a diameter of 3 mm and a length of 5 mm.

Then, the granules were sent to fluid dryer 4 where they were dried at 250° C. for 10 minutes until they reached absolute dryness. Subsequently, the granules were sent to fluid calcining furnace 6 where they were calcined at 1,000° C. for 15 minutes. After calcination, the product was sent to high speed cooler 8 where it was cooled with cold air for 15 minutes.

Figure 2:
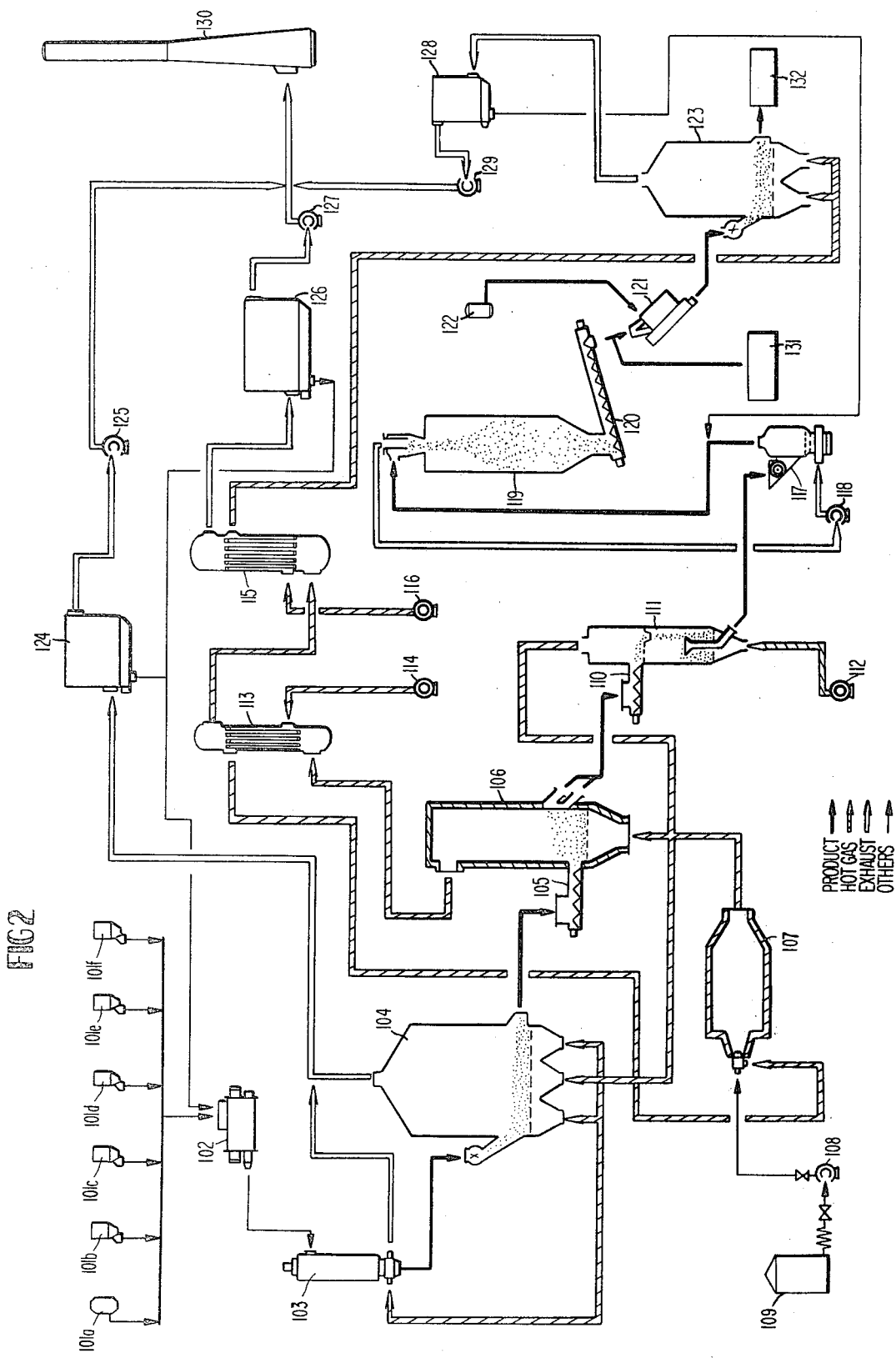
FIG. 2 is a flow sheet for the production of citric acid soluble silicate fertilizer according to the second embodiment of the invention.

Next, the second embodiment of the invention will be described with reference to FIG. 2. As shown in the left upper part of FIG. 2, there are provided the first to sixth continuous quantitative feeders 101a–101f for continuously measuring and supplying starting materials. Among them, first continuous quantitative feeder 101a continuously measures an alcoholic waste liquor or other binder and supplies it to continuous kneader 102. Similarly, the second continuous quantitative feeder 101b handles $K_2CO_3$, KOH or other potassium source, the third feeder 101c handles MgO source, the fourth feeder 101d handles minor constituents, and the sixth feeder 101f handles fly ash. The fifth continuous quantitative feeder 101e is a reserve. The starting materials, which have continuously been kneaded together into a slime by means of continuous kneader 102, are sent to extruder 103 and formed into granules, such as pellets, after which the pellets are transported to fluid dryer 104.

Fluid dryer 104 is a fluidized bed dryer equipped with a porous plate in which the granules are fluidized by high temperature hot air leaving high speed cooling device 111, mentioned later, and thoroughly contacted with the hot air, whereby granules are dried with a high efficiency. The dried granules are then sent to fluid calcining furnace 106 by screw feeder 105. Floating dust leaving fluid drying device 104 is combined with floating dust leaving the outlet of extruder 103 and captured by dry dust chamber 124. Waste gas is sucked by waste gas fan 125, and released into the atmosphere via chimney 130.

Hot air generator 107 is provided as a heat source for fluid calcining furnace 106, where a fuel oil supplied from fuel tank 109 is burned to give the necessary hot air.

Fluid calcining furnace 106 is a fluidized bed type of furnace equipped with a porous plate in which the granules are fluidized by hot air supplied from hot air generator 107 and calcined at a temperature of about 600° to about 1,100° C. for about 15 minutes while thoroughly contacted with the hot air. The component of fly ash reacts with potassium to form citric acid soluble potassium. The high temperature waste gas leaving fluid calcining furnace 106 is subjected to heat exchange in the first heat exchanger 113, and then again returned to hot air generator 107.

The product, which has been calcined in fluid calcining furnace 106, is sent to high speed cooling device 111 by screw feeder 110. High speed cooling device 111 is a fluidized bed type of apparatus equipped with a porous plate in which the high temperature product is fluidized by low temperature air supplied by cooling air fan 112. There is thorough contact between the product and the low temperature air so that cooling progresses quite rapidly. Hot air leaving high speed cooling device 111 is sent to fluid dryer 104 where it is used as a drying medium.

The cooled product is pulverized in pulverizer 117 and then transported into product storage tank 119 where it is stored. Floating dust forming in the product storage tank 119 is recovered by means of transportation fan 118 and returned to pulverizer 117. Product stored in product storage tank 119 is sent to granulator 121 by screw feeder 120. On the other hand, water or a water-soluble binder is also fed to granulator 121 by continuous quantitative feeder 122. After being granulated, the product is sent to second fluid dryer 123. It should be noted here that the calcined product can also be recovered before it enters granulator 121 with the aim of shipping it as a powdery product 131.

Second fluid dryer 123 is a fluidized bed type of apparatus equipped with porous plate in which the product is fluidized by hot air, which has been sent from drying air blower 116 and heated by second heat exchanger 15, so that drying progresses with a high efficiency.

It should be noted here that a hot air of appointed temperature can be introduced into second fluid dryer 123 with a very high heat efficiency. This is so because high temperature waste gas leaving fluid calcining furnace 106 gives its own heat to air sent from blower 114 in the first heat exchanger 113, and the air thus heated gives its own heat to the air sent from blower 116 in second heat exchanger 15.

Floating dust leaving second fluid dryer 123 is captured in dry dust chamber 128, and the waste gas is sucked by waste gas fan 129 and released into the atmosphere via chimney 130. The floating dust leaving second heat exchanger 15 is captured in dry dust chamber 126, and the waste gas is sucked by waste gas fan 127 and released into the atmosphere via chimney 130.

Granular product 132, which has been dried in second fluid dryer 123, is transported to a package station (not shown in FIG. 2) where it is packaged and then shipped.

What is claimed is:

1. An apparatus for producing a citric acid soluble potassium silicate fertilizer comprising:
    (a) a plurality of continuous quantitative feeders for supplying a binder, a potassium source, fly ash and pulverized coal for forming a mixture;
    (b) a continuous kneader for continuously kneading said mixture;
    (c) an extruder for forming the resulting kneaded mixture into granules;
    (d) a fluidized dryer for drying the granules to a state of substantially absolute dryness;
    (e) a fluidized calcining furnace for calcining dried granules in order to chemically react potassium with silicon present in the fly ash and thereby form a citric acid soluble potassium silicate; and
    (f) a cooling device for cooling the resulting calcined product.

2. Apparatus according to claim 1, wherein said feeders continuously measure and feed said potassium source, said fly ash and said pulverized coal and feed these substances at predetermined rates.

3. Apparatus according to claim 1, additionally equipped with:
    a pulverizer for pulverizing calcined and cooled product;
    a product storage tank for storing product pulverized in said pulverizer;
    a screw feeder for transporting product to said product storage tank;
    means for adding a binder to pulverized product;
    a granulator for granulating the resulting binder-containing mixture into granules;
    a second fluidized dryer for drying the granules formed by said granulator; and
    means for removing the granular product from said second fluidized dryer and transporting it to packaging means.

4. Apparatus according to claim 3, wherein said second fluidized dryer is equipped with a recovering device for floating dust present in waste gas therefrom, said recovering device being connected to said second dryer.

5. Apparatus according to claim 1, additionally equipped with:
    a pulverizer for pulverizing calcined and cooled product;
    a product storage tank for storing product pulverized in said pulverizer;
    a screw feeder for transporting product to said product storage tank; and
    means for removing pulverized product from said storage tank and transporting it to packaging means.

6. Apparatus according to claim 5, wherein said fluidized dryer is equipped with a dry dust chamber for recovering floating dust in waste gas from said dryer, said dry dust chamber being connected to said fluidized dryer.

7. Apparatus according to claim 5, wherein said fluidized calcining furnace is equipped with a hot air generator for generating a calcining medium, said hot air generator being connected to said fluidized calcining furnace.

8. Apparatus according to claim 5, wherein said fluidized calcining furnace is equipped with a heat exchanger for recovering waste heat from waste gas from said furnace, said heat exchanger being connected with said fluidized calcining furnace and waste heat recovered is utilized in the fluidized dryer.

9. Apparatus according to claim 5, wherein said plurality of quantitative feeders include at least one reserve feeder.

10. Apparatus according to claim 5, wherein said fluidized calcining furnace is equipped with a first heat exchanger and a second heat exchanger for recovering waste heat, both of the heat exchangers being connected to said calcining furnace, and waste heat recovered is utilized in a second fluidized dryer.

11. Apparatus according to claim 10, wherein said second heat exchanger is equipped with a recovering device for floating dust present in waste gas after being heat exchanged, said recovering device being connected to said second fluidized dryer.

* * * * *